July 30, 1935.  J. N. STOFER  2,009,682

VEHICLE TAIL LIGHT

Filed May 3, 1934

Inventor
James N. Stofer

By Hardway Cather
Attorneys

Patented July 30, 1935

2,009,682

UNITED STATES PATENT OFFICE 2,009,682

VEHICLE TAIL LIGHT

James N. Stofer, Galveston, Tex.

Application May 3, 1934, Serial No. 723,771

2 Claims. (Cl. 240—8.18)

This invention relates to a vehicle tail light.

An object of the invention is to provide in combination with a fixed casing of a reflector therein equipped with a light socket and an extension cord connected with a source of electrical supply and adapted to be wound about the reflector with suitable flexible guards arranged about the windings of the cord and attached to the light socket and pressing against the casing so as to hold the reflector in spaced relation with the casing and to protect the cord from coming into frictionable contact with the casing and being injured.

Another object is to provide in a tail light a removable reflector containing a light socket and globe and an extension cord through which an electrical circuit may be completed through the globe, said reflector and the globe being removable as a unit from the casing whereby a portable source of light is provided for use about the vehicle.

With the above and other objects in view, the invention has particular relation to certain novel features of construction, arrangement of parts and use, an example of which is given in this specification and illustrated in the accompanying drawing, wherein.

Figure 1:
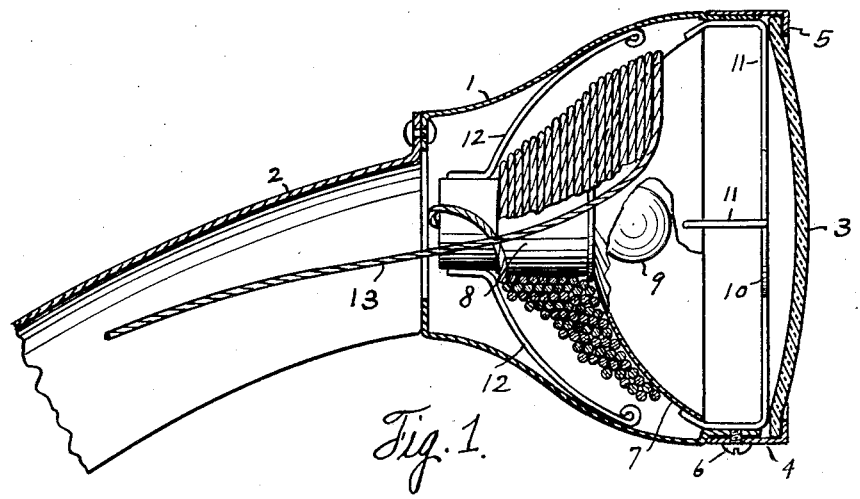
Figure 1 shows a sectional view of the tail light and supporting bracket assembled.
Figure 2:
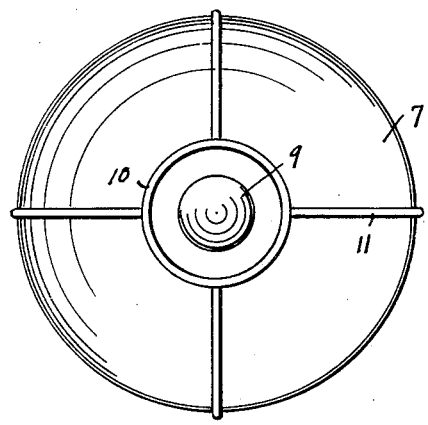
Figure 2 shows a front elevation of the reflector.
Figure 3:
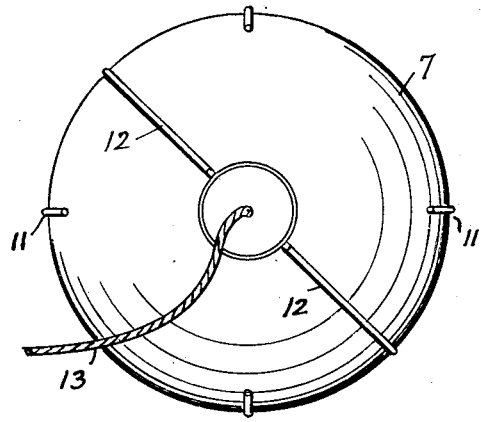
Figure 3 shows a rear elevation.
Figure 4:
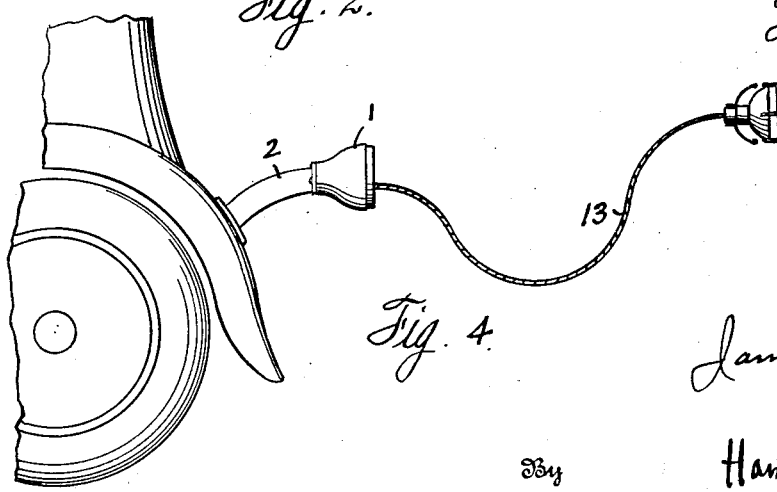
Figure 4 shows a fragmentary side view of a vehicle showing the tail light casing, showing the reflector removed therefrom.

In the drawing the numeral 1 designates the tail light casing which is fixed to the bracket 2 at the rear end of the vehicle. The casing has the usual rearwardly directed lens 3 which is secured in place by the band 4 having the overturned margin 5 which engages the margin of the lens. The band 4 is fitted over the open end of the casing and may be secured in place by the set screw 6.

Within the casing there is the concavo convex reflector 7 having the globe socket 8 to receive the electric light globe 9. There is a protecting cage to protect the reflector and light globe, said cage being formed of the ring 10 and arms 11 extending outwardly therefrom and secured to the margins of the reflector.

Fastened, at one end, to the socket 8 are the guards 12, 12, preferably oppositely arranged and outwardly curved and whose free ends yieldingly engage the inner wall of the casing to hold the reflector centered in the casing. There is an extension cord 13, connected to the vehicle battery and socket 8, which may be wound around the light socket and reflector within the guards 12. The cord will be so wound when the reflector is located within the casing and the guards 12 also serve to hold the arms 11 in yielding contact with the lens 3, the outer ends of said arms 11 fitting closely within the open end of the casing 1.

When it is desired to use the tail light about the vehicle for general lighting purposes the set screw 6 may be removed and the band 4 and the lens 3 taken off and the reflector may then be removed from the casing and the extension cord unwound therefrom so that the light will be readily portable.

Only the required amount of the cord 13 need be unwound, in using the light, to give the required range of movement and while the light is being used the guards 12 will prevent an unnecessary amount of cord from becoming unwound to the end that the cord will thus be better protected while the light is being used and no unnecessary cord will become unwound to become entangled or in the way.

The drawing and description disclose what is now considered to be a preferred form of the invention by way of illustration only, while the principle of the invention will be defined by the appended claims.

What I claim is:

1. In combination a tail light casing, a lens thereon, a reflector in the casing, a cage on the reflector, a light globe in the reflector, flexible guards connected with the reflector and yieldingly engaging the casing and holding the cage yieldingly against the lens, an extension cord wound about the reflector within the guards and electrically connecting the globe with a source of electrical supply.

2. The combination with a tail light casing, of a reflector therein, flexible guards attached to the reflector and whose free portions yieldingly engage the casing, a light globe in the reflector, an extension cord adapted to be connected to a source of electrical energy and with said globe, said guards being arranged to retain the cord in position wound around the reflector.

JAMES N. STOFER.